Patented Oct. 7, 1941

2,258,292

UNITED STATES PATENT OFFICE 2,258,292

ART OF REGULATING THE GROWTH OF PLANTS

Franklin D. Jones, Llanerch, Pa., assignor to American Chemical Paint Company, Ambler, Pa., a corporation of Delaware No Drawing. Application October 9, 1939, Serial No. 298,703

19 Claims. (Cl. 47—58)

This invention relates to the art of regulating or controlling the growth of plants.

In one of its phases, the invention has particular reference to compositions and methods for regulating or controlling the growth of higher plant life as distinguished from lower or parasitic plant life such as fungi.

In another of its phases, the invention concerns itself more particularly with compositions and methods for treating fungus-infested plants to eradicate the fungi and the diseases caused by the fungi.

Prior to this invention, it was known that the growth of plants could be influenced, regulated or controlled by means of certain organic compounds, now variously referred to as "plant hormones," "growth promoters," and "growth substances." As examples of such substances, which will hereinafter be referred to by the convenient term "plant hormones," may be mentioned phenyl, naphthyl, and indole acetic, propionic and butyric acids and certain of their derivatives such as the nitriles, lower alkyl esters and alkali metal and ammonium salts.

The plant hormones may be used either to stimulate or to retard the growth of plants as may be desired by the plant breeder in a particular case. They may be used to speed up the germination of seeds and to stimulate the formation of roots, buds and flowers, as well as to cause stem elongation. They may also be used to inhibit or retard the formation of roots, buds and flowers and to inhibit or retard stem elongation. The plant hormones may also be used to promote the healing of plant wounds and to produce seedless fruits without the use of pollen (parthenocarpy). In addition, they may be used as described in my prior application Serial No. 247,366, filed December 23, 1938, to eradicate the lower or parasitic plants such as fungi and the diseases caused by the fungi.

The present invention is based on the discovery or observation that the amides of the plant hormone acids included in the foregoing list are particularly effective as plant growth substances and that they have certain advantages over previously used or suggested growth substances. For instance, c-naphthylacetamide, which constitutes the preferred embodiment of the invention, is more active in producing artificial formation of fruits (parthenocarpy), in initiating rooting, and in inhibiting bud formation than most of the previously known growth substances. Naphthylacetamide also has the great advantage over other growth substances in that it produces no appreciable amount of epinasty (leaf curling or stem bending). I have also discovered that the amides of the plant hormones are also effective to eradicate fungi and the diseases produced by fungi, particularly when the amides are admixed with thiourea.

In its very essence, the composition of this invention, consists of a mixture of an amide derived from a plant hormone acid such as the amides of phenyl, naphthyl, and indole acetic acid, propionic and butyric acids, and an inert diluent, vehicle or carrier. The inert diluent may be a solvent for the amide such as water or water and alcohol, or it may be an oil or fat of either vegetable, animal or mineral origin such as olive oil, castor oil, lanolin or petroleum oil, etc., in which case the composition may be in the form of a suspension or emulsion. The diluent may also be a dry powdered filler such as talc, bentonite, clay, kaolin, charcoal, ground carbon or wood flour, in which latter case the composition will be in the form of a dry powder or dust. The composition may also contain thiourea, particularly if the composition is to be used to stimulate the formation of roots on cuttings, to improve stem growth or to eradicate fungi. If thiourea is included in the composition it should be present in an amount equivalent to 10% to 30% of the weight of the acid amide.

The concentration of the essential ingredient (the acid amide) depends a great deal upon the nature of the diluent, carrier or vehicle, the particular species and form of plant to be treated, the length of time that the plant is to be exposed to the composition, and the particular effect desired.

By way of example, it may be stated that if the composition is to be used in dry form on cuttings, seeds or bulbs, it may contain 11 parts of the amide and 5000 parts of talc. Three parts of thiourea may be added to enhance the activity of the amide. If the composition is to be used in solution or emulsion form for the same purpose, it may contain 9 parts of amide and 50,000 parts of a solvent such as water. One part of thiourea may be added. If the composition is to be applied in solution form for an extended period of time, it has been found advisable to reduce the amount of the hormone. For instance, if the composition is to be applied for a period of twenty-four hours, the concentration of amide may be reduced as much as 90%. The reduction in amount of acid amide is not necessary if the composition is to be applied in dry form.

If the composition is to be used as a spray for parthenocarpy, it may contain 1 part of amide in 100,000 parts of a solvent such as water. If it is to be used as a spray for bud inhibition, the composition may contain one or more parts of amide in 50,000 parts of solvent such as water. Generally speaking, no thiourea should be added when the composition is to be used for bud inhibition.

If the composition is to be used as a fungicide, it should, as has been previously stated, preferably contain thiourea in addition to the acid amide, and may also contain a wetting agent to facilitate penetration of the fungi by the composition. As examples of suitable wetting agents, may be mentioned sulphonated alcohols of the fatty series having from eight to thirty carbon atoms. The wetting agent may be present in about 10 parts to 100,000 parts of the composition.

As an example of a suitable fungicide in dry form may be mentioned a composition containing 9 parts of naphthylacetamide, 1 to 3 parts of thiourea and 5000 parts of powdered filler such as talc. If the composition is in solution or emulsion form, it may advantageously contain 9 parts of the amide, 1 to 3 parts of thiourea, and 50,000 parts of solvent or diluent.

The compositions of the invention may be applied to plants, slips, leaf cuttings, stem cuttings, scions, tubers, seeds, bulbs, seedlings, fruit or flowers in any of the various ways known to the art. For example, to induce better rootings of cuttings, the base of the cutting may be dipped into a composition in solution, emulsion or dust form. Seeds and bulbs may be treated by soaking them in a solution of the composition for about twenty-four hours, after which they may be dried sufficiently to permit them to be handled in sowing or planting. Seeds and bulbs may also be dusted with the composition in dry form, or coated with an emulsion of the composition. A convenient way of applying the composition to growing plants is by spraying.

The fungicidal compositions of the invention may be applied for the eradication of fungi and parasitic diseases in at least one or more of the following ways:

1. To the seed or bulbs before sowing or planting.
2. To the soil before or after planting.
3. To the seedlings when they have barely emerged.
4. To the grown plants.
5. To the fruit.

Treatment of the seed before sowing has been found to be particularly advantageous. The treatment not only rids the seeds of fungi, but it also greatly improves the germination. Excellent results have also been obtained by applying the fungicidal composition directly to the diseased area of seedling and plants.

The use of the term "plants" in the appended claims is intended to include plants, slips, leaf cuttings, stem cuttings, scions, tubers, roots, seeds, bulbs, seedlings, fruit and flowers, wherever the context permits.

This application contains matter, which has been carved out of application Serial No. 247,366 filed December 23, 1938.

In conclusion, it is to be understood that although the invention has been described in considerable detail and certain specific terms and language have been utilized, the present disclosure is illustrative rather than restrictive and that changes and modifications may be resorted to without departing from the spirit or scope of the invention as defined in the hereunto appended claims.

I claim:

1. A growth regulating composition for plants, said composition containing as an essential ingredient an amide of a plant hormone acid.
2. A growth regulating composition for plants, said composition containing as an essential ingredient naphthylacetamide.
3. A growth regulating composition for plants, said composition containing an amide of a plant hormone acid dissolved in water.
4. A growth regulating composition for plants, said composition containing naphthylacetamide dissolved in water.
5. A growth regulating composition for plants, said composition containing an amide of a plant hormone acid dispersed in a substance selected from the group consisting of animal, mineral and vegetable fats and oils.
6. A growth regulating composition for plants, said composition containing naphthylacetamide dispersed in a substance selected from the group consisting of animal, mineral and vegetable fats and oils.
7. A method of treating plants, which consists in subjecting the plant to the action of an amide of a plant hormone acid.
8. A method of treating plants to regulate or control their growth, which consists in subjecting the plant to the action of naphthylacetamide.
9. A method of treating seed before planting, which consists in treating the seed with a composition containing an amide of a plant hormone acid.
10. A method of treating seed before planting, which consists in treating the seed with a composition containing naphthylacetamide.
11. A growth regulating composition for plants containing as an essential ingredient a substance selected from the group consisting of the amides of phenyl, naphthyl, and indole acetic, propionic and butyric acids.
12. A growth regulating composition for plants containing an amide of a plant hormone acid, thiourea, and an inert diluent.
13. A growth regulating composition for plants containing naphthylacetamide, thiourea, and an inert diluent.
14. A method of treating plants, which consists in subjecting the plant to the action of a composition containing an amide of a plant hormone acid, thiourea, and an inert diluent.
15. A method of treating plants, which consists in subjecting the plant to the action of a composition containing naphthylacetamide, thiourea, and an inert diluent.
16. A growth regulating composition for plants, a relatively minute proportion of said composition consisting of an amide of a plant hormone acid.
17. A growth regulating composition for plants, a relatively minute proportion of said composition consisting of naphthylacetamide.
18. A method of treating plants to regulate or control their growth which consists in subjecting the plant to the action of a composition which contains a relatively minute quantity of an amide of a plant harmone acid.
19. A method of treating plants to regulate or control their growth which consists in subjecting the plant to the action of a composition which contains a relatively minute quantity of naphthylacetamide.

FRANKLIN D. JONES.